(12) United States Patent
Kim (10) Patent No.: US 11,745,948 B2
(45) Date of Patent: Sep. 5, 2023

(54) METHOD FOR SORTING CARGO USING THE AUTOMATED GUIDED VEHICLE

(71) Applicant: Gachisoft Inc., Daejeon (KR)

(72) Inventor: Ho Yon Kim, Sejong (KR)

(73) Assignee: Gachisoft Inc., Daejeon (KR)

( * ) Notice: Subject to any disclaimer, the term of this patent is extended or adjusted under 35 U.S.C. 154(b) by 118 days.

(21) Appl. No.: 17/488,799

(22) Filed: Sep. 29, 2021

(65) Prior Publication Data

US 2023/0102469 A1 Mar. 30, 2023

(30) Foreign Application Priority Data

Sep. 29, 2021 (KR) ........................ 10-2021-0129191

(51) Int. Cl.
*B65G 11/02* (2006.01)
*B07C 3/00* (2006.01)
*B07C 5/36* (2006.01)

(52) U.S. Cl.
CPC ............ *B65G 11/023* (2013.01); *B07C 3/005* (2013.01); *B07C 5/362* (2013.01); *B07C 2501/0063* (2013.01); *G05D 2201/0216* (2013.01)

(58) Field of Classification Search
CPC .......... B07C 5/36; B07C 5/362; B07C 3/005; B07C 2501/0063; B65G 11/023
See application file for complete search history.

(56) References Cited

U.S. PATENT DOCUMENTS 10,464,106 B1  11/2019  Mo et al.
10,682,672 B2   6/2020  Bombaugh et al.
10,710,121 B1   7/2020  Mo et al.
(Continued)

FOREIGN PATENT DOCUMENTS

KR   10-2010-0022888 A   3/2010
KR   10-2019-0046212 A   5/2019
(Continued)

OTHER PUBLICATIONS

Korean Office Action dated Feb. 20, 2023, in counterpart Korean Patent Application No. 10-2021-0129191 (4 Pages in Korean).
(Continued)

*Primary Examiner* — Michael McCullough
*Assistant Examiner* — Jessica L Burkman
(74) *Attorney, Agent, or Firm* — NSIP Law (57) ABSTRACT

A method of sorting cargo using an automated guided vehicle is provided. The method of sorting cargo includes: recognizing the pieces of cargo; assigning a location of a carrier pocket into which the recognized cargo is loaded among the plurality of carrier pockets in the automated guided vehicle and a location of the destination chute from which the carrier pocket discharges the cargo; loading the cargo into the location of the assigned carrier pocket; for consecutively supplied pieces of cargo thereafter, repeatedly performing identifier information recognition of the cargo, location assignment, and cargo loading sequentially; sequentially discharging the pieces of cargo to the locations of the assigned destination chutes by allowing the automated guided vehicle into which all pieces of cargo are loaded to start and move along a movement path; and returning the automated guided vehicle after the automated guided vehicle has finished discharging.

11 Claims, 7 Drawing Sheets

(56) References Cited

U.S. PATENT DOCUMENTS

| | | | |
|---|---|---|---|
| 10,717,112 | B2 | 7/2020 | Bombaugh et al. |
| 10,933,445 | B1 | 3/2021 | Parrish et al. |
| 11,537,982 | B1 * | 12/2022 | Mehta ................. B65G 1/1373 |
| 2017/0320101 | A1 | 11/2017 | Bombaugh et al. |
| 2018/0326458 | A1 | 11/2018 | Bombaugh et al. |
| 2020/0338602 | A1 | 10/2020 | Mo et al. |
| 2020/0346250 | A1 | 11/2020 | Bombaugh et al. |
| 2022/0024691 | A1 * | 1/2022 | Serstad ................ B65G 1/0492 |
| 2022/0088779 | A1 * | 3/2022 | Lu .......................... B25J 9/1661 |
| 2022/0371054 | A1 * | 11/2022 | Han ......................... B07C 3/08 |

FOREIGN PATENT DOCUMENTS

| | | |
|---|---|---|
| KR | 10-2020-0099943 A | 8/2020 |
| KR | 10-2219031 B1 | 2/2021 |

OTHER PUBLICATIONS

PCT International Search Authority search report dated Jun. 20, 2022, in counterpart U.S. Appl. No. 17/488,799, (3 pages in Korean).

PCT International Search Authority written opinion dated Jun. 20, 2022, in counterpart U.S. Appl. No. 17/488,799, (3 pages in Korean).

* cited by examiner

MOVEMENT PATH OF
AUTOMATED GUIDED VEHICLE

FIG. 6

ORDERED CARGO AND QUANTITY LIST

| ORDER 1: B1, D1 |
| ORDER 2: A1, B2, D1 |
| ORDER 6: A2, E1, F1, K1 |
| ORDER 9: B1, D1, F2, G1 |
| ORDER 12: G1, N2, D2 |
| ORDER 17: A3, D2, M3 |
| ORDER x: ... |

(a)

TOTAL PICKING (CARGO AND QUANTITY)

| A 6 |
| B 4 |
| D 7 |
| E 1 |
| F 3 |
| G 2 |
| K 1 |
| M 3 |
| N 2 |
| ... |

(b)

INITIAL CHUTE MAPPING (EXAMPLE)

| C1 - ORDER 1 |
| C2 - ORDER 2 |
| C3 - ORDER 3 |
| C4 - ORDER 4 |
| C5 - ORDER 5 |
| C6 - ORDER 6 |
| C7 - ORDER 7 |
| C8 - ORDER 8 |
| C9 - ORDER 9 |
| ... |

(c)

SEQUENTIAL SUPPLY | D  A  A  F  D  D  M ...

METHOD FOR SORTING CARGO USING THE AUTOMATED GUIDED VEHICLE

CROSS-REFERENCE TO RELATED APPLICATION(S)

This application claims priority from Korean Patent Application No. 10-2021-0129191, filed on Sep. 29, 2021, in the Korean Intellectual Property Office, the disclosure of which is incorporated herein by reference in its entirety.

BACKGROUND

1. Field

The following description relates to a logistics processing technology, and more particularly, to cargo transport and sorting technology.

2. Description of Related Art

The demand for high-speed cargo processing is increasing due to the growth of parcel delivery markets and the construction of base-type logistics centers. The cargo processing in logistics centers is evolving from partial automation to full automation. Accordingly, the demand for a system for sorting cargo that automatically sorts pieces of cargo is increasing.

Fully automated logistics may be built using an automated guided vehicle (AGV). The AGV moves through a combination of software and a sensor-based guidance system. Acceleration, deceleration, and obstacle detection bumpers are precisely controlled, and pieces of cargo may be transported safely and stably.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a method of sorting cargo using an automated guided vehicle that is capable of transporting a plurality of pieces of cargo at a time using an automated guided vehicle robot and efficiently distributing the pieces of cargo when discharging the pieces of cargo to a plurality of destination chutes for sorting.

In one general aspect, a method of sorting cargo using an automated guided vehicle includes: recognizing the pieces of cargo by reading identifier information of the cargo supplied to the automated guided vehicle; assigning a location of a carrier pocket into which the recognized cargo is loaded among the plurality of carrier pockets in the automated guided vehicle and a location of the destination chute from which the carrier pocket discharges the cargo; loading the cargo into the location of the assigned carrier pocket; for consecutively supplied pieces of cargo thereafter, repeatedly performing identifier information recognition of the cargo, location assignment, and cargo loading sequentially; sequentially discharging the pieces of cargo to the locations of the assigned destination chutes by allowing the automated guided vehicle into which all pieces of cargo are loaded to start and move along a movement path; and returning the automated guided vehicle after the automated guided vehicle has finished discharging.

In the assigning of the location, a combination with maximum operation efficiency may be selected from among combinations of the locations of the destination chutes to which current pieces of cargo are to be discharged and the locations of the carrier pockets where the pieces of cargo are assigned to be discharged to the destination chutes.

In the assigning of the location, when there are a plurality of options for the destination chutes to which cargo loaded into a predetermined carrier pocket is discharged, at least one of efficiency of a flow line according to destination chute assignment among a plurality of selectable destination chutes and operation efficiency of the automated guided vehicle according to the carrier pocket assignment among the plurality of carrier pockets in the automated guided vehicle according to each destination chute may be determined to assign a destination chute and a carrier pocket with highest efficiency.

In the assigning of the location, when there are other automated guided vehicles into which at least one piece of cargo is being loaded, the locations of the carrier pocket and the destination chute may be assigned so as to achieve an overall optimal combination in consideration of even the operation efficiency of the other automated guided vehicles.

In the assigning of the location, at least one of the location of the carrier pocket and the location of the destination chute may be assigned so that the plurality of carrier pockets in the same automated guided vehicle discharge pieces of cargo to destination chutes within a preset distance or destination chutes on a movement path of the automated guided vehicle.

In the assigning of the location, when a location of a destination chute of a newly loaded cargo is assigned, a currently assigned destination chute may be reassigned so that a movement flow line of the automated guided vehicle to the destination chute for all pieces of cargo loaded into at least one other carrier pocket in the automated guided vehicle so far is minimized.

In the assigning of the location, physical locations of the destination chutes assigned to each piece of cargo may be reassigned to the pieces of cargo currently loaded in the plurality of carrier pockets in the automated guided vehicle, the destination chutes assigned to each piece of cargo may be reassigned, or the locations of the carrier pockets into which each piece of cargo is loaded may be reassigned.

In the assigning of the location, the location of the carrier pocket in the automated guided vehicle may be assigned so that the plurality of pieces of cargo having the destination chute and having a size smaller than that of the carrier pocket are loaded in one carrier pocket.

In the assigning of the location, for the plurality of pieces of cargo having a size larger than that of the carrier pocket, the location of the carrier pocket in the automated guided vehicle to spread the plurality of pieces of cargo across the plurality of carrier pockets may be assigned.

In the repeatedly performing, for the consecutively supplied pieces of cargo, the identifier information recognition of the cargo, the location assignment, and the cargo loading sequentially are repeatedly performed sequentially until all of the plurality of carrier pockets in the automated guided vehicle are loaded or there are no more pieces of cargo to load.

The method may further include: switching the plurality of carrier pockets to a ready state while the automated guided vehicle is returning.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Various advantages and features of the present invention and methods accomplishing the same will become apparent from the following detailed description of embodiments with reference to the accompanying drawings. However, the present invention is not limited to exemplary embodiments to be described below but may be implemented in various different forms, these exemplary embodiments will be provided only in order to make the present invention complete and allow those skilled in the art to completely recognize the scope of the present invention, and the present invention will be defined by the scope of the claims. Throughout the specification, like reference numerals denote like elements.

When it is determined that the detailed description of the known functions or configurations in describing the embodiments of the present invention may obscure the gist of the present invention, the detailed description thereof will be omitted, and the following terminologies are defined in consideration of the functions in the embodiments of the present invention and may be construed in different ways by users, an intention of operators, or conventions. Therefore, the definitions thereof should be construed based on the contents throughout the specification.

Combinations of each block of the accompanying block diagram and each step of the accompanying flow chart may also be performed by computer program instructions (execution engine), and since these computer program instructions may be mounted in a processor of a general computer, a special computer, or other programmable data processing apparatuses, these computer program instructions executed through the process of the computer or the other programmable data processing apparatuses create a means for performing functions described in each block of the block diagram or each step of the flow chart.

Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including an instruction means performing the functions described in each block of the block diagram or each step of the flow chart.

Then, since the computer program instructions may also be mounted on the computer or the other programmable data processing apparatuses, the instructions perform a series of operation steps on the computer or the other programmable data processing apparatuses to create processes executed by the computer, thereby operating the computer or the other programmable data processing apparatuses and may also provide steps for performing the functions described in each block of the block diagram or each step of the flow chart.

In addition, each block or each step may indicate some of modules, segments, or codes including one or more executable instructions for executing a specific logical function (specific logical functions). Further, it is to be noted that functions described in the blocks or the steps occur regardless of a sequence in some alternative embodiments. For example, two blocks or steps that are consecutively shown may actually be simultaneously performed or may be performed in a reverse sequence depending on corresponding functions.

Hereinafter, embodiments of the present invention will be described in detail with reference to the accompanying drawings. Exemplary embodiments in the present invention may be modified in many different forms and the scope of the present invention is limited to exemplary embodiments to be described below. The embodiments of the present invention are provided to more completely explain the present invention to those of ordinary skill in the art to which the present invention pertains.

Figure 1:
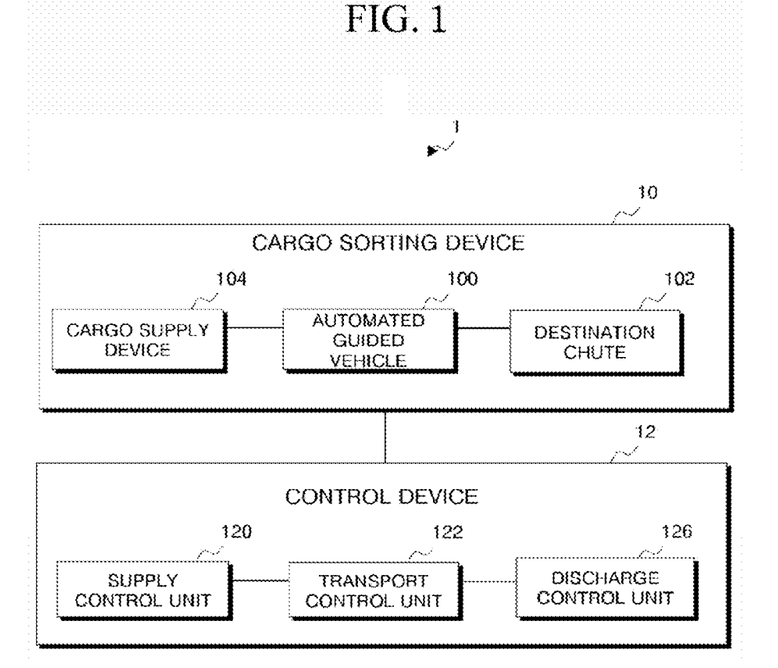
FIG. 1 is a diagram illustrating a configuration of a system for sorting cargo according to an embodiment of the present invention.

FIG. 1 is a diagram illustrating a configuration of a system for sorting cargo according to an embodiment of the present invention.

Referring to FIG. 1, a system 1 for sorting cargo includes a cargo sorting device 10 and a control device 12. The cargo sorting device 10 includes an automated guided vehicle 100, a plurality of destination chutes 102, and a cargo supply device 104. The control device 12 includes a supply control unit 120, a transport control unit 122, and a discharge control unit 124.

The cargo supply device 104 is a device that supplies cargo to the automated guided vehicle 100. The cargo supply device 104 may supply a plurality of pieces of cargo to the automated guided vehicle 100 while transporting the plurality of pieces of cargo through a conveyor belt. In this case, pieces of cargo may be supplied to the automated guided vehicle 100 one by one using a robot arm provided in the cargo supply device 104. The cargo supply device 104 may be provided as a plurality of cargo supply devices.

The automated guided vehicle 100 is a small transport vehicle that may freely move within a workplace and is a device for sorting a plurality of pieces of cargo by carrying the plurality of pieces of cargo and then dropping the plurality of pieces of cargo to the plurality of destination chutes 102. The automated guided vehicle 100 may be provided as a plurality of automated guided vehicles. The automated guided vehicle 100 may move along a movement path where markers such as lines are attached to a floor or may move by autonomous driving.

The plurality of destination chutes 102 are devices in which pieces of cargo are discharged and sorted from the automated guided vehicle 100. The plurality of destination chutes 102 may be discharge destination chutes, compartments, conveyors, and the like. The plurality of destination chutes 102 may be formed as a conveyor to which a plurality of attachments are attached and may be in the form of a plurality of tote boxes mounted on the conveyor. When a plurality of destination chutes 102 are formed as the conveyor, the automated guided vehicle 100 discharges and sorts pieces of cargo to the conveyor, and when the sorting operation is finished, the conveyor moves to process the pieces of cargo loaded into each destination chute 102.

It is possible to move and sort one piece of cargo using the automated guided vehicle 100 but it is not efficient to load and sort pieces of cargo one by one. The automated guided vehicle 100 of the present invention may load a plurality of pieces of cargo at once, sort the loaded pieces of cargo into the plurality of destination chutes 102, and then return to a location where the cargo supply device 104 is located.

A method in which the automated guided vehicle 100 is equipped with a robot arm, carries a plurality of pieces of cargo and then takes out the pieces of cargo one by one using the robot arm, and discharges the pieces of cargo to the destination chute 102 is also possible. In this case, there is a problem in that a robot's unit price is high, it is not easy to pick up pieces of cargo when the pieces of cargo are taken out, and a weight thereof is heavy. Accordingly, the present invention proposes a technology capable of efficiently, simply, inexpensively, and efficiently discharging a plurality of individual pieces of cargo without using the robot arm using the automated guided vehicle 100.

The supply control unit 120 of the control device 12 loads a plurality of pieces of cargo supplied from the cargo supply device 104 into a plurality of carrier pockets in the automated guided vehicle 100. In this case, the supply control unit 120 may assign a location of a carrier pocket to load cargo among the plurality of carrier pockets in the automated guided vehicle 100 and a location of a destination chute where the corresponding carrier pocket is to discharge the cargo.

The transport control unit 122 transports pieces of cargo to each destination chute 102 while controlling a movement path of the automated guided vehicle 100 into which pieces of cargo are loaded into locations of a plurality of carrier pocket assigned by the supply control unit 120. The discharge control unit 124 discharges pieces of cargo, which are loaded into a plurality of carrier pockets in the automated guided vehicle 100 to locations of each destination chute 102 assigned by the supply control unit 120 for sorting.

Figure 2:
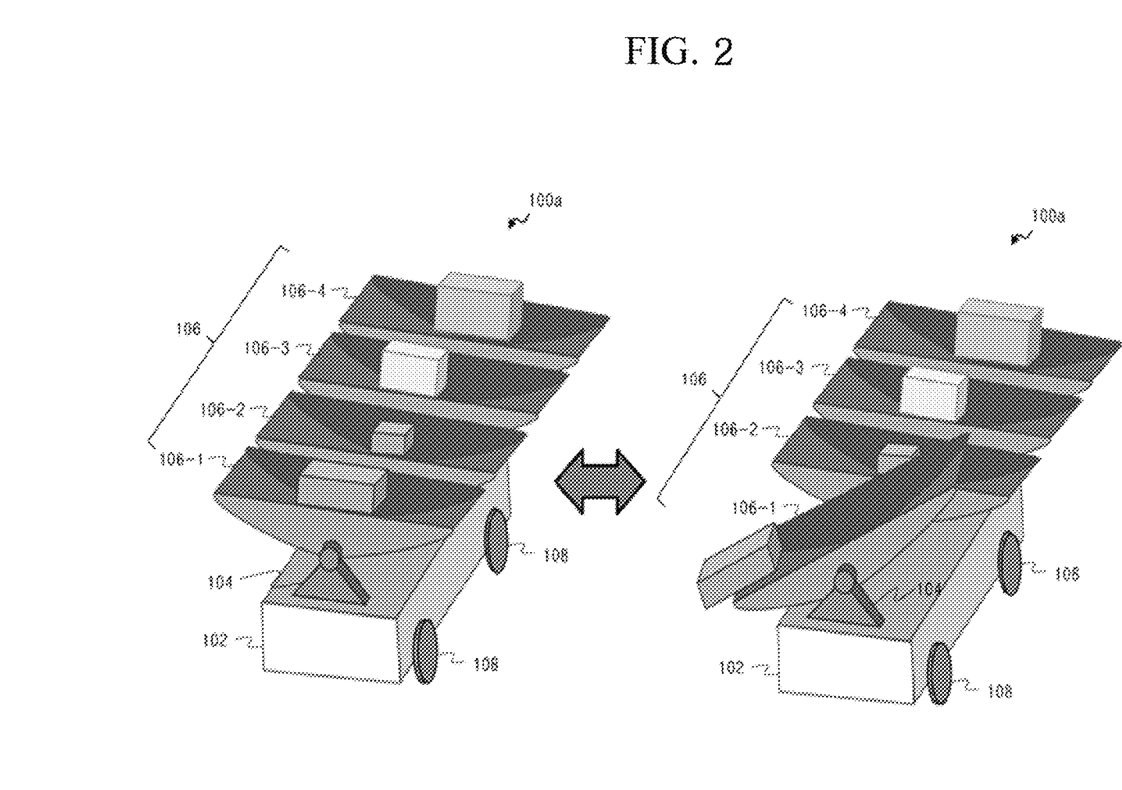
FIGS. 2 and 3 are diagrams illustrating an automated guided vehicle according to an embodiment of the present invention.
Figure 3:
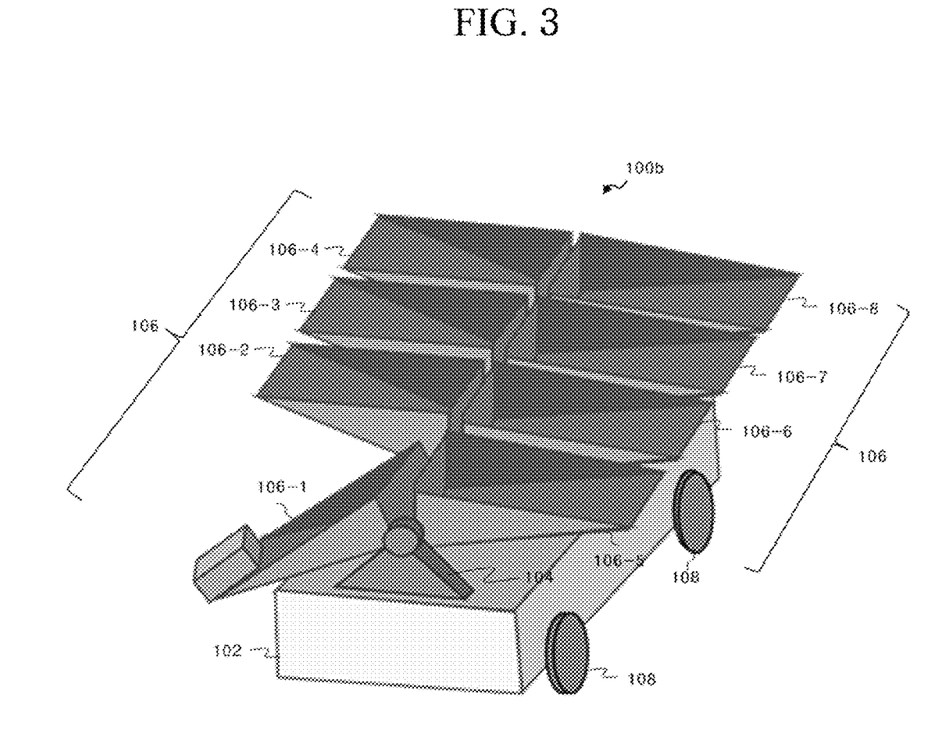

FIGS. 2 and 3 are diagrams illustrating an automated guided vehicle according to an embodiment of the present invention.

Referring to FIGS. 1 to 3, automated guided vehicles 100a and 100b each include a body 102, a support 104, a plurality of carrier pockets 106, and a wheel 108.

The automated guided vehicles 100a and 100b each load a plurality of pieces of cargo into the plurality of carrier pockets 106 when entering a ready mode, move the plurality of pieces of cargo loaded into the plurality of carrier pockets 106 when entering a moving mode, discharge the plurality of pieces of cargo to the plurality of destination chutes when entering a discharge mode, and return when entering a return mode to be switched to the ready mode. In the automated guided vehicles 100a and 100b, the carrier pocket 106 may be horizontal, or have an inside tilted lower than an outside thereof to prevent pieces of cargo from falling out when entering the ready mode and the moving mode and an outside tilted lower than the inside thereof for discharging when entering the discharge mode.

The plurality of carrier pockets 106 are each supported by the support 104 and have a space in which a plurality of pieces of cargo may be loaded, and a plurality of pieces of cargo are loaded in the space. Each carrier pocket 106 may have any shape as long as it has the space in which pieces of cargo are loadable. The support 104 is mounted on the body 102 to support the carrier pocket 106.

Each carrier pocket 106 is separate from each other and can be tilted. The discharge control unit 124 individually controls each carrier pocket 106 as illustrated in FIGS. 2 and 3 and tilts a predetermined carrier pocket 106 outward in the discharge mode to discharge at least one piece of cargo loaded therein to a destination chute. In this case, when the cargo loaded in a predetermined carrier pocket arrives at the destination chute to be discharged, the discharge control unit 124 individually controls only the corresponding carrier pocket to discharge the cargo to the destination chute at which the cargo arrives and does not discharge pieces of cargo loaded in other carrier pockets until the pieces of cargo arrive at other destination chutes to which the pieces of cargo are to be discharged.

FIG. 2 illustrates four carrier pockets 106-1, 106-2, 106-3, and 106-4, and FIG. 3 illustrates eight carrier pockets 106-1, 106-2, 106-3, 106-4, 106-5, 106-6, 106-7, and 106-8, but this is only for aiding in understanding of the present invention, and the number of carrier pockets is not limited thereto.

The automated guided vehicle 100a of FIG. 2 has a structure in which pieces of cargo may be discharged in both left and right directions as it is tilted in both left and right directions using each carrier pocket 106-1, 106-2, 106-3, and 106-4 fixed to each support part 104. On the other hand, an example in which the automated guided vehicle 100b of FIG. 3 has one of the left carrier pockets 106-1, 106-2, 106-3, and 106-4 for discharging pieces of cargo in the left direction and one of the right carrier pockets 106-5, 106-6, 106-7, and 106-8 for discharging pieces of cargo in the right direction, which are mounted in a pair on one support 104, is illustrated.

The automated guided vehicle 100b of FIG. 3 has a structure in which it is difficult to freely use both carrier pockets. For example, the left carrier pockets 106-1, 106-2, 106-3, and 106-4 may have limited discharge to the right, and the right carrier pockets 106-5, 106-6, 106-7, and 106-8 may have limited discharge to the left. The present invention proposes a method of controlling the automated guided vehicle 100b, which has a limited bidirectional discharge, to efficiently load pieces of cargo into a plurality of carrier pockets and then efficiently discharge the pieces of cargo to the destination chute for sorting.

The supply control unit 120 may independently load at least one piece of cargo into each carrier pocket 106. The discharge control unit 124 may control the carrier pocket 106 to be tilted toward the destination chute by gravity when a predetermined cargo loaded into the carrier pocket 106 is loaded into the destination chute.

The tilted carrier pockets 106 may be made vertical again to discharge the cargo to the destination chute. To this end, the system 1 for sorting cargo may further include a tilted guide (not illustrated) provided on the movement path of the automated guided vehicles 100a and 100b. For example, the automated guided vehicles 100a and 100b have the tilted guide (not illustrated) provided on the movement path through which pieces of cargo pass so that the pieces of cargo are unloaded on the destination chute and then are loaded again, and the tilted guide automatically pushes up the tilted side of the carrier pocket 106 during the movement of the automated guided vehicles 100*a* and 100*b*, thereby switching the automated guided vehicles 100*a* and 100*b* to the ready mode. When the tilted guide pushes up the carrier pocket 106 of the automated guided vehicles 100*a* and 100*b*, the tilted guide is caught in a latch or attached to an electromagnet, and thus, the automated guided vehicles 100*a* and 100*b* enter the ready mode again.

To this end, the tilted guide is located on the movement path to which the automated guided vehicles 100*a* and 100*b* return and includes a tilted part. The automated guided vehicles 100*a* and 100*b* are each pushed up as the carrier pocket 106, of which an exterior is tilted, climb up the tilted part on the movement path to which the automated guided vehicles 100*a* and 100*b* return after discharging a plurality of pieces of cargo to a plurality of destination chutes, and thus, are switched to the ready mode.

Figure 4:
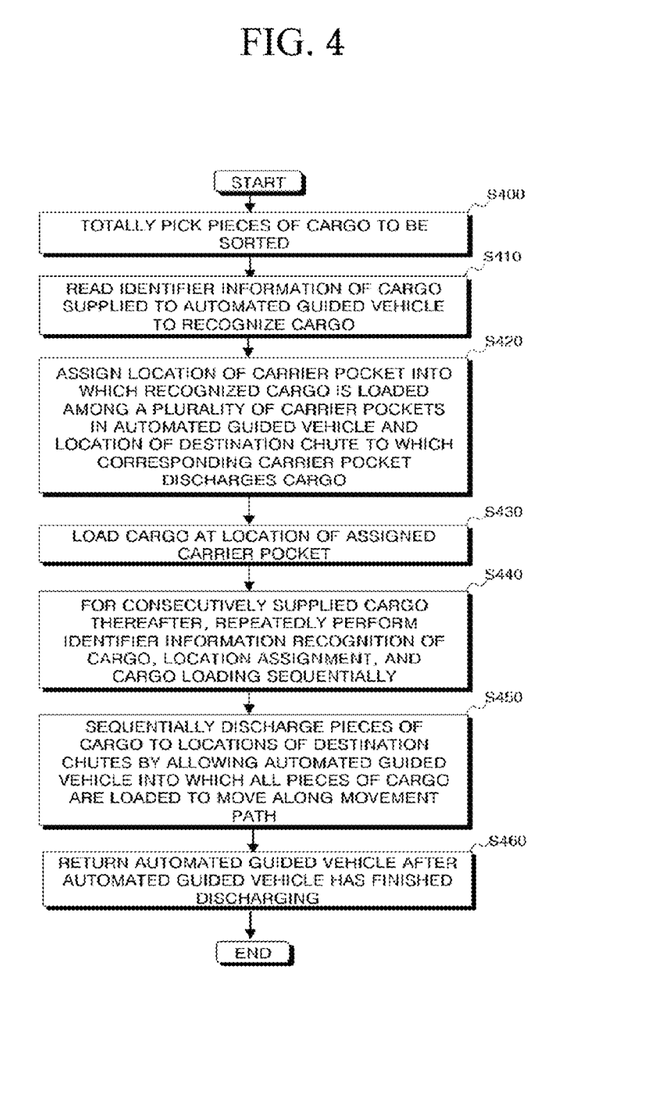
FIG. 4 is a diagram illustrating a flow of a method of sorting cargo using an automated guided vehicle according to an embodiment of the present invention.

FIG. 4 is a diagram illustrating a flow of a method of sorting cargo using an automated guided vehicle according to an embodiment of the present invention.

Referring to FIGS. 1 and 4, first, the automated guided vehicle 100 prepares for cargo sorting by total picking of pieces of cargo to be sorted (S400). The total picking is a method of finding and fetching pieces of cargo in the whole order that consists of multiple orders at once. For example, when there are order 1, order 2, . . . , order n, the ordered cargo may include product 1, product 2, . . . , product m, and some of these products may or may not have overlapping orders. In this case, the automated guided vehicle 100 brings as many of product 1 as a quantity in the whole order, and also brings as many of product 2 as a quantity in the whole order.

The total picking may be performed automatically or may be performed manually. For example, when the supply control unit 120 for automatically performing the total picking controls the cargo supply device 104 to automatically load pieces of cargo into the automated guided vehicle 100 using the robot arm, the supply control unit 120 controls the location of the carrier pocket in the automated guided vehicle 100 into which each piece of cargo is to be loaded to be transmitted to the automated guided vehicle 100. Then, the supply control unit 120 controls the automated guided vehicle 100 to load the cargo supplied from the cargo supply device 104 to be loaded into the location of the corresponding carrier pocket. Subsequently, the supply control unit 120 controls the automated guided vehicle 100 to discharge the cargo to the corresponding destination chute when discharging the cargo loaded into the assigned carrier pocket in the automated guided vehicle 100 in connection with the destination chute information to be discharged.

The supply control unit 120 that manually performs the total picking may guide an operator to the location of the carrier pocket into which cargo is to be loaded by, for example, a method of illuminating a location of a carrier pocket to be loaded in order to inform an operator of a loading location or displaying a loading location on a monitor. In addition, it is possible to detect and inform whether pieces of cargo are loaded into a location of a carrier pocket designated by an actual operator by a vision technology or a sensor.

Next, the automated guided vehicle 100 reads identifier information of cargo supplied to the automated guided vehicle 100 to recognize the cargo (S410). The identifier information of the cargo may be, for example, a barcode. A barcode is printed or assigned to each piece of cargo, in which the barcode is a code that includes a series of numbers, such as invoice numbers and receipt numbers, uniquely assigned to pieces of cargo. The barcode information is used as an identifier for tracking or referencing cargo. In addition, sender information and recipient information received from a sender when receiving cargo match the barcode and are stored in a management server. The sender and recipient information includes a name, an address, and a zip code.

The cargo identification information may include not only barcodes but also identification codes in which letters and numbers are combined, address information, etc. In this case, the automated guided vehicle 100 may acquire an image of cargo and read the acquired image data to recognize cargo identification information. In this case, by applying a Korean character recognition technology, it is possible to recognize Korean character information such as an address and a product name.

Then, the automated guided vehicle 100 assigns a location that includes a location of a carrier pocket into which the recognized cargo is to be loaded among a plurality of carrier pockets in the automated guided vehicle 100 and a location of a destination chute where the corresponding carrier pocket is to discharge cargo (S420).

Then, the automated guided vehicle 100 loads cargo into the assigned carrier pocket position (S430).

Then, the automated guided vehicle 100 repeatedly performs identification information recognition of cargo, location assignment, and cargo loading sequentially for consecutively supplied pieces of cargo thereafter (S440). The repeatedly performing of operation (S440) may be repeatedly performed until all of the plurality of carrier pockets in the automated guided vehicle 100 are loaded, and thus, there are no more carrier pockets to load, or until there are no more pieces of cargo to load.

Subsequently, the automated guided vehicle 100, which has completed loading of all pieces of cargo, starts and moves along the movement path and sequentially discharges the pieces of cargo to the locations of the assigned destination chutes, respectively (S450).

Then, the automated guided vehicle 100 finishes discharging and returns again (S460). During the return, the automated guided vehicle 100 may switch the plurality of carrier pockets to ready mode.

In the location assigning operation S420, the automated guided vehicle 100 may assign a location of a carrier pocket to load cargo and then assign a location of a destination chute to which the loaded cargo is discharged, assign the location of the destination chute, and then assign the location of the carrier pocket, and perform the location assignment of the destination chute simultaneously.

In the location assignment step (S420), the case where the location of the destination chute is first assigned corresponds to the case where it is advantageous to an operation flow line of the automated guided vehicle 100 to assign the position of the carrier pocket loading the current cargo according to which direction the destination chute is in the movement path of the automated guided vehicle 100. In this case, the automated guided vehicle 100 first goes through an operation of assigning a destination chute to which the current cargo is discharged and then assigns into which location of a carrier pocket among a plurality of carrier pockets in the automated guided vehicle 100 the current cargo is to be loaded in order to discharge the cargo to the corresponding destination chute.

There may be a plurality of options for the destination chutes to which cargo loaded into a predetermined carrier pocket is discharged. As such, depending on into which carrier pocket in the automated guided vehicle 100 the current cargo is loaded according to each destination chute among a plurality of selectable destination chutes, it may be different whether the operation efficiency of the automated guided vehicle is high. Accordingly, the automated guided vehicle 100 may select a combination with the highest operation efficiency among the combinations of the locations of the destination chutes to which the current cargo is to be discharged and the locations of the carrier pockets where cargo is to be discharged to the destination chute. In this case, the operation efficiency may be highest when the operation flow line of the automated guided vehicle 100 is minimized. For example, by visiting the smallest number of destination chutes and visiting the nearest destination chute, the operation flow line is minimum.

Since the automated guided vehicle 100 has a plurality of carrier pockets, it is possible to select the combination with the highest operation efficiency by considering not only the currently loaded cargo but also the locations of the destination chutes of pieces of cargo loaded into other carrier pockets in the same automated guided vehicle. For example, several carrier pockets in the same automated guided vehicle may be assigned to destination chutes within a preset distance or may be assigned to the destination chutes on the movement path of the automated guided vehicle, thereby increasing efficiency.

In the location assigning operation S420, when the automated guided vehicle 100 assigns the destination chutes of pieces of cargo loaded into the plurality of carrier pockets, the automated guided vehicle 100 may determine at least one of efficiency of a flow line according to destination chute assignment among a plurality of selectable destination chutes and operation efficiency of the automated guided vehicle according to the carrier pocket assignment among the plurality of carrier pockets in the automated guided vehicle according to each destination chute to assign the destination chute and the carrier pocket with the highest efficiency.

In the location assigning operation (S420), the automated guided vehicle 100 may change the destination chute if necessary for overall route efficiency, even for the carrier pocket to which the destination chute has been already assigned. This is because the optimal path may change when newly loaded cargo is included. Therefore, even if the carrier pocket has already been assigned the destination chute, when a location of a destination chute of a newly loaded cargo is assigned, the automated guided vehicle 100 may reassign the already assigned destination chute so that a movement flow line of the destination chute for all pieces of cargo loaded into at least one other carrier pocket in the automated guided vehicle 100 so far is optimized.

In the location assigning operation (S420), the automated guided vehicle 100 may dynamically change the location of the destination chute to optimize the movement path. The physical location of the destination chute may be assigned a logical address or delivery address for sorting. When the processing of the corresponding order is completed, the next order may be assigned and the corresponding logical address or delivery address may be reassigned. Therefore, even in the physical destination chute that has already been assigned the logical address or the delivery address, when cargo has not been sorted yet, the cargo may be reassigned to other physical destination chutes or reassigned by an order including the same cargo. Therefore, it is possible to increase the efficiency of the sorting operation by considering reassigning the destination chute.

In summary, in the location assigning operation (S420), for pieces of cargo currently loaded into the plurality of carrier pockets in the automated guided vehicle and pieces of cargo to be loaded into the plurality of carrier pockets, when reassigning the physical location of the assigned destination chute of each piece of cargo, reassigning the destination chute of the cargo, or reassigning the location of the carrier pocket to load the current cargo, the automated guided vehicle 100 may reassign the overall carrier pocket so that the overall operation efficiency may be highest.

In the location assigning operation S420, the automated guided vehicle 100 may assign the location of the carrier pocket so that one or more pieces of cargo that may be assigned to the same destination chute may be loaded into one carrier pocket. That is, when allocating the destination chute to distribute the current cargo and the carrier pocket to be used to be transported to the destination chute, provided that only the empty carrier pocket is considered but also that the destination chute has the same carrier pocket, and the sizes of the pieces of cargo are small and thus the pieces of cargo may be jointly loaded, it is also possible to load a plurality of pieces of cargo in one carrier pocket.

When the destination chute has the same carrier pocket and duplicate loading is possible, it is possible to use the corresponding carrier pocket, and when the space is insufficient, it is possible to use one or more carrier pockets even for the same destination chute. For example, when the size of the cargo is larger than that of the carrier pocket, it is possible to spread the pieces of cargo across the plurality of carrier pockets. That is, a plurality of carrier pockets may be assigned to one and the same destination chute, and a plurality of pieces of cargo may be assigned to be loaded in the plurality of carrier pockets, or one piece of cargo may be assigned to be loaded in the plurality of carrier pockets.

Hereinafter, a scenario to which the method of sorting cargo of an automated guided vehicle described above is applied will be described below with reference to FIGS. 5 to 7 by way of example.

Figure 5:
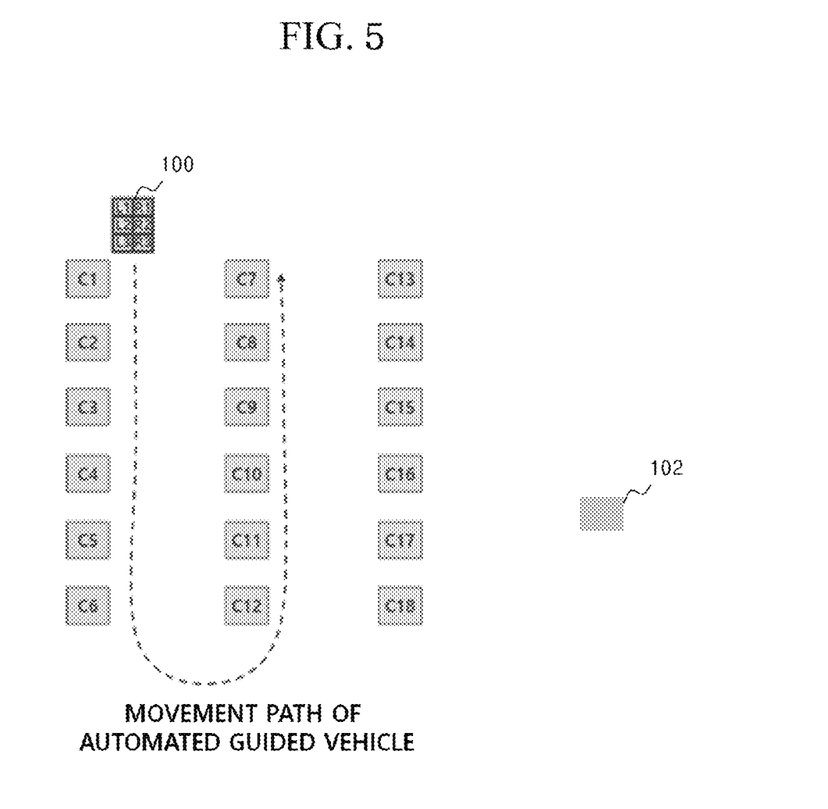
FIG. 5 is a diagram illustrating a movement path of an automated guided vehicle according to an embodiment of the present invention.

FIG. 5 is a diagram illustrating a movement path of an automated guided vehicle according to an embodiment of the present invention.

Referring to FIGS. 1 and 5, assuming that the destination chutes 102 for loading pieces of cargo are arranged as illustrated in FIG. 5, the automated guided vehicle 100 passes between the destination chutes 102 and sorts the cargo. In this case, the automated guided vehicle 100 may not have a bidirectional restriction, but as illustrated in FIG. 5, there may be a case where the discharge direction is limited because the discharge location is determined to the left or right. In this case, the optimal operation path may only be calculated by considering both the discharge direction and the flow line. FIG. 5 is an exemplary diagram of the automated guided vehicle 100 having six carrier pockets.

Figure 6:
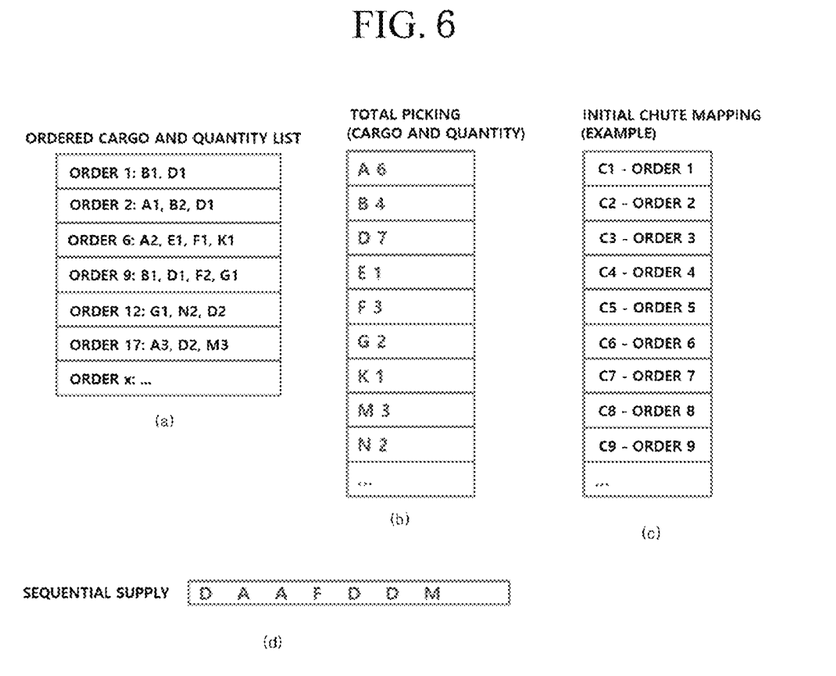
FIG. 6 shows tables for a) order cargo and quantity list, b) total picking list, c) initial destination chute mapping information, and d) sequential cargo supply list according to an embodiment of the present invention.

FIG. 6 shows tables for a) order cargo and quantity list, b) total picking list, c) initial destination chute mapping information, and d) sequential cargo supply list according to an embodiment of the present invention.

Referring to FIG. 6, as illustrated in FIG. 6A, given a list of order pieces of cargo and order quantity to be processed at a time, the cargo supply device 104 executes total picking based on this list. For example, the total picking fetching of as many pieces of the cargo as included in the total picking list of FIG. 6B is performed.

Before starting cargo sorting, the automated guided vehicle 100 assigns a destination chute for each order as illustrated in FIG. 6C.

Then, the cargo supply device 104 starts supplying the totally picked cargo to the automated guided vehicle 100 as illustrated in FIG. 6D. In this case, it is possible to randomly supply pieces of cargo.

Then, in order for the automated guided vehicle 100 to recognize the supplied cargo and assign into which carrier pocket and in which direction of the automated guided vehicle 100 currently on standby the corresponding cargo is to be loaded, the automated guided vehicle 100 determines which of the orders requiring the current cargo the pieces of cargo are assigned to. When the location of the destination chute where the determined order may be located is changeable, the automated guided vehicle 100 may evaluate whether the operation efficiency of the automated guided vehicle 100 currently on standby is optimal by determining which order of which destination chute and which carrier pocket in which discharge direction pieces of cargo are assigned. The location of the carrier pocket and the destination chute is assigned in the combination with the maximum evaluation value. In this case, when there are other automated guided vehicles loading at least one piece of cargo, the locations of the carrier pocket and the destination chute are assigned so that the overall optimal combination is made by taking into account the operation efficiency of the other automated guided vehicles as well.

Figure 7:
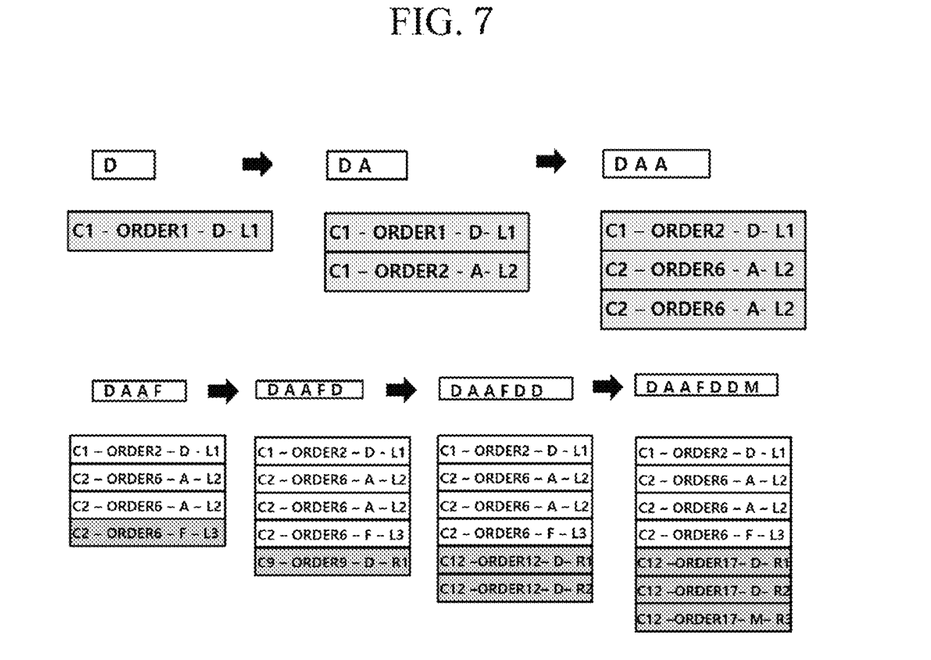
FIG. 7 is a diagram illustrating a carrier pocket assignment process in one automated guided vehicle when pieces of cargo are supplied in a cargo supply order in the scenario situation of FIG. 6 according to an embodiment of the present invention.

FIG. 7 is a diagram illustrating a carrier pocket assignment process in one automated guided vehicle when pieces of cargo are supplied in a cargo supply order in the scenario situation of FIG. 6 according to an embodiment of the present invention.

Referring to FIGS. 1 and 7, the automated guided vehicle 100 assigns order 1 when cargo D is first supplied and assigns the order 1 to destination chute C1. The carrier pocket is assigned to L1 in the left direction.

Subsequently, when cargo A is supplied, the automated guided vehicle 100 reads the order cargo and the quantity list in FIG. 6 to confirm that order 2 that ordered both the cargo D and cargo A is present. In this case, since the operation efficiency is maximized when one automated guided vehicle visits the smallest number of destination chutes and visits the near destination chutes, the automated guided vehicle reassigns the cargo D, which was previously assigned to the order 1, from the order 1 to the order 2.

Also, when the operation efficiency may be improved by reassigning the order 2 to the destination chute C1, the destination chute is also reassigned. Now, both the cargo D and cargo A are simultaneously discharged from the destination chute C1 at the same time.

Next, one more of cargo A is supplied. Assume that the cargo A is a cargo small enough to load two pieces of cargo into one carrier pocket. Since there is an order sheet ordering two or more of cargo A, the cargo A may be double loaded in carrier pocket L2. Since order 6 has an order for two of cargo A, another cargo A is placed in the carrier pocket L2, and the cargo A assigned to the order 2 is reassigned to the order 6. In addition, the order 6 may be assigned to the destination chute C2 to make room to reduce the flow line.

Next, cargo F is supplied. Since the cargo F is also in order 6 and needs to be loaded into an L side of the carrier pocket, the cargo F is also assigned to carrier pocket L3.

Next, when the cargo D is supplied, the remaining carrier pocket is now only in the right direction, and thus order 9 is assigned to destination chute C9 and is loaded into carrier pocket R1.

Next, when the cargo D is supplied again, since there is order 12 for two pieces of cargo D, the previously loaded cargo in the carrier pocket R1 is also changed to order 12, and the carrier pocket R2 is assigned to the order 12 so that all the pieces of cargo in the carrier pockets R1 and R2 may be discharged to the destination chute C12.

Next, when cargo M is supplied, since there is an order 17 for both the cargo D and cargo M, all of the carrier pockets R1, R2, and R3 are assigned to order 17, and when the order 17 is reassigned to the destination chute 12, since all carrier pockets in an R direction need to be discharged from the destination chute C12, the movement path and the number of destination chutes to be visited may be reduced.

The above example takes only one automated guided vehicle as an example, and even when cargo is being loaded on a plurality of automated guided vehicles at the same time, the combinations of the locations of the carrier pockets and the locations of the destination chutes are optimized so that the number of destination chutes and the number of movement paths that each automated guided vehicle needs to visit may be minimized in the carrier pocket.

According to a method of sorting cargo using an automated guided vehicle according to an embodiment, it is possible for an automated guided vehicle with limited bidirectional discharge to efficiently load pieces of cargo into a plurality of carrier pockets and then efficiently discharge the loaded pieces of cargo to a destination chute for sorting.

Hereinabove, the present invention has been described with reference to exemplary embodiments thereof. It will be understood by those skilled in the art to which the present invention pertains that the present invention may be implemented in a modified form without departing from essential characteristics of the present invention. Therefore, the exemplary embodiments disclosed herein should be considered in an illustrative aspect rather than a restrictive aspect. The scope of the present invention should be defined by the claims rather than the above description, and equivalents to the claims should be interpreted to fall within the present invention.

What is claimed is:

1. A method of sorting cargo using an automated guided vehicle having a plurality of carrier pockets, transporting a plurality of pieces of cargo loaded into the plurality of carrier pockets, and discharging the plurality of pieces of cargo to a plurality of destination chutes, the method comprising:

recognizing the plurality of pieces of cargo by reading identifier information of the plurality of pieces of cargo supplied to the automated guided vehicle;

assigning a location of a carrier pocket into which a recognized cargo is loaded among the plurality of carrier pockets in the automated guided vehicle and a location of the destination chute from which the carrier pocket discharges the cargo;

loading the cargo into the location of the assigned carrier pocket;

for consecutively supplied pieces of cargo thereafter, repeatedly performing identifier information recognition of the cargo, location assignment of the carrier pocket and the destination chute, and cargo loading sequentially;

sequentially discharging the plurality of pieces of cargo to a plurality of locations of the assigned destination chutes by allowing the automated guided vehicle into which all pieces of cargo are loaded to start and move along a movement path; and returning the automated guided vehicle to a location where a cargo supply device supplying cargo to the automated guided vehicle is located after the automated guided vehicle has finished discharging.

2. The method of claim 1, wherein the location assignment of the carrier pocket and the destination chute is conducted such that a maximum operation efficiency is achieved by selecting combinations of locations of the destination chutes to which current pieces of cargo are to be discharged and locations of the carrier pockets where the plurality of pieces of cargo are assigned to be discharged to the destination chutes, and wherein the maximum operation efficiency is achieved when an operation flow line of the automated guided vehicle is minimized.

3. The method of claim 2, wherein, in the location assignment of the carrier pocket and the destination chute, when there are a plurality of options for the destination chutes to which cargo loaded into a predetermined carrier pocket is discharged, at least one of efficiency of a flow line of the automated guided vehicle according to destination chute assignment among a plurality of selectable destination chutes and operation efficiency of the automated guided vehicle according to the carrier pocket assignment among the plurality of carrier pockets in the automated guided vehicle according to each destination chute is determined to assign a destination chute and a carrier pocket with highest efficiency, wherein the at least one of efficiency is highest when the operation flow line of the automated guided vehicle is minimized.

4. The method of claim 2, wherein, in the location assignment of the carrier pocket and the destination chute, when there are additional automated guided vehicles into which at least one piece of cargo is being loaded, the locations of the carrier pocket and the destination chute are assigned so as to achieve an overall optimal combination in consideration of an operation efficiency of the other additional automated guided vehicles, wherein the maximum operation efficiency is achieved when an operation flow line of the automated guided vehicle is minimized.

5. The method of claim 1, wherein, in the location assignment of the carrier pocket and the destination chute, at least one of the location of the carrier pocket and the location of the destination chute is assigned so that the plurality of carrier pockets in the same automated guided vehicle discharge pieces of cargo to destination chutes within a preset distance or destination chutes on a movement path of the automated guided vehicle.

6. The method of claim 1, wherein, in the location assignment of the carrier pocket and the destination chute, when a location of a destination chute of a newly loaded cargo is assigned, a currently assigned destination chute is reassigned so that a movement flow line of the automated guided vehicle to the destination chute for all pieces of cargo loaded into at least one other carrier pocket in the automated guided vehicle so far is minimized.

7. The method of claim 1, wherein, in the location assignment of the carrier pocket and the destination chute, physical locations of the destination chutes assigned to each piece of cargo are reassigned to the pieces of cargo currently loaded in the plurality of carrier pockets in the automated guided vehicle, the destination chutes assigned to each piece of cargo are reassigned, or the locations of the carrier pockets into which each piece of cargo is loaded are reassigned.

8. The method of claim 1, wherein, in the location assignment of the carrier pocket and the destination chute, the location of the carrier pocket in the automated guided vehicle is assigned so that the plurality of pieces of cargo having the destination chute and having a size smaller than that of the carrier pocket are loaded in one carrier pocket.

9. The method of claim 1, wherein, in the location assignment of the carrier pocket and the destination chute, for the plurality of pieces of cargo having a size larger than that of the carrier pocket, the location of the carrier pocket in the automated guided vehicle to spread the plurality of pieces of cargo across the plurality of carrier pockets is assigned.

10. The method of claim 1, wherein, in the repeatedly performing, for the consecutively supplied pieces of cargo thereafter, the identifier information recognition of the cargo, the location assignment of the carrier pocket and the destination chute, and the cargo loading are repeatedly performed sequentially until all of the plurality of carrier pockets in the automated guided vehicle are loaded or there are no more pieces of cargo to load.

11. The method of claim 1, further comprising switching the plurality of carrier pockets to a ready state while the automated guided vehicle is returning.

* * * * *